(12) United States Patent
Hill et al.

(10) Patent No.: US 6,394,615 B1
(45) Date of Patent: May 28, 2002

(54) DEVICE FOR ENHANCING THE VISIBILITY OF PORTABLE COMPUTER DISPLAY SCREENS BY SHIELDING DIRECT AND INDIRECT LIGHT FROM THE DISPLAY SCREEN AND THE EYES OF THE USER

(75) Inventors: David Wayne Hill, Cary; David Andrew Sawin, Durham, both of NC (US); Tomoyuki Takahashi, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,319

(22) Filed: May 19, 2000

(51) Int. Cl.[7] .............................. G02B 5/08; G02B 27/00
(52) U.S. Cl. ...................... 359/608; 359/601; 348/834
(58) Field of Search ................................ 359/601–614, 359/808, 819, 408, 474; 348/834, 842; D14/114, 239; 361/681–683

(56) References Cited

U.S. PATENT DOCUMENTS

| 2,683,391 | A | * | 7/1954 | Nichols | 359/474 |
|---|---|---|---|---|---|
| 3,329,770 | A | | 7/1967 | Rose | 348/842 |
| 4,121,303 | A | | 10/1978 | Reece | 359/601 |
| 4,314,280 | A | * | 2/1982 | Rose | 348/834 |
| 4,865,420 | A | * | 9/1989 | Schmidt | 359/601 |
| 5,069,529 | A | | 12/1991 | Takahashi | 359/601 |
| 5,095,385 | A | | 3/1992 | Stroll, Jr. | 359/609 |
| 5,218,474 | A | | 6/1993 | Kirschner | 359/601 |
| 5,528,424 | A | * | 6/1996 | Lentz et al. | 359/601 |
| 5,717,566 | A | * | 2/1998 | Tao | 361/681 |
| 5,877,896 | A | | 3/1999 | Gremban | 359/601 |
| 5,905,546 | A | | 5/1999 | Giulie et al. | 348/842 |
| 5,988,823 | A | * | 11/1999 | Wong | 359/601 |
| 6,144,419 | A | * | 11/2000 | Schmidt | 348/842 |

\* cited by examiner

*Primary Examiner*—Thong Q Nguyen
(74) *Attorney, Agent, or Firm*—Bracewell & Patterson, LLP; J. Bruce Schelkopf (57) ABSTRACT

A collapsible-light shield for a portable computer shields direct and indirect light from the computer display and from the eyes of the user. The light shield has four flexible panels that form a tubular shape when in use. One end of the light shield has a contoured viewing port through which the user may view the screen. The other end of the light shield has a ring-like elastic fastener that detachably secures to three sides of the computer display. Each panel has two bisecting fold lines about which the tubular light shield may be collapsed into a substantially flat profile that is a small fraction of its original size.

8 Claims, 8 Drawing Sheets

DEVICE FOR ENHANCING THE VISIBILITY OF PORTABLE COMPUTER DISPLAY SCREENS BY SHIELDING DIRECT AND INDIRECT LIGHT FROM THE DISPLAY SCREEN AND THE EYES OF THE USER

BACKGROUND OF THE INVENTION

1. Technical Field

The present invention relates in general to improving the visibility of portable computer display screens, and in particular to an improved light shield for laptop computers. Still more particularly, the present invention relates to a device for enhancing the visibility of portable computer display screens by shielding direct and indirect light from the display screen and the eyes of the user.

2. Description of the Prior Art

Figure 1:
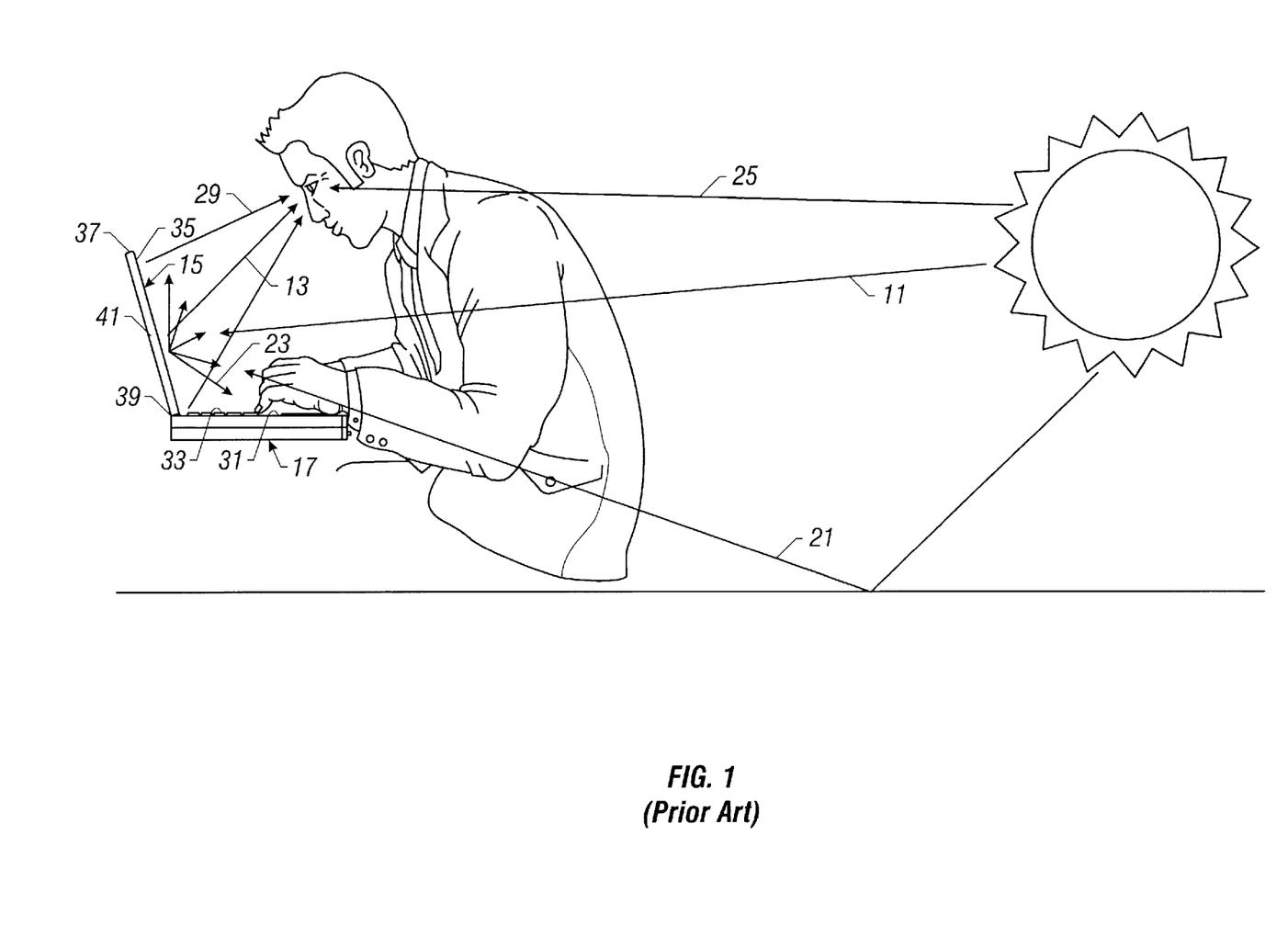
FIG. 1 is a schematic diagram of a conventional laptop computer during use in a brightly lit environment.
Figure 2:
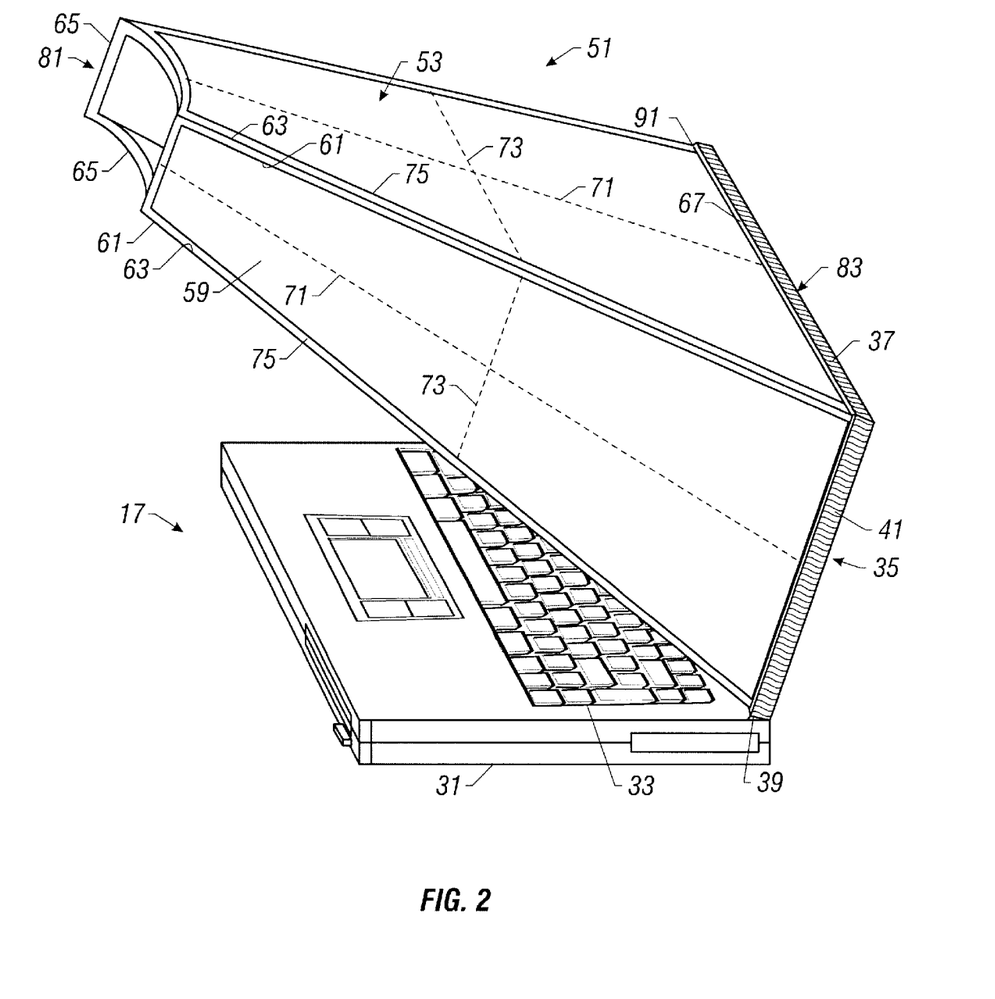
FIG. 2 is a front isometric view of a laptop computer fitted with a light shield constructed in accordance with the invention.
Figure 3:
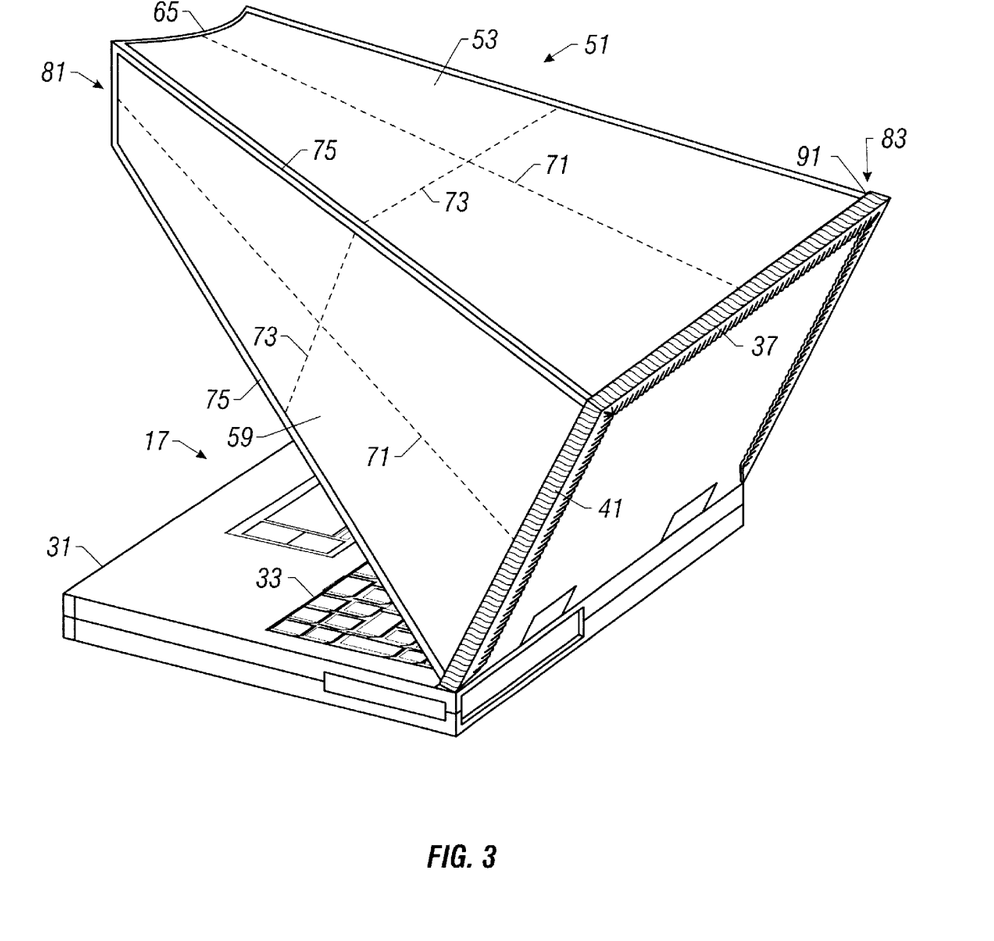
FIG. 3 is a rear isometric view of the laptop computer and light shield of FIG. 2.
Figure 4:
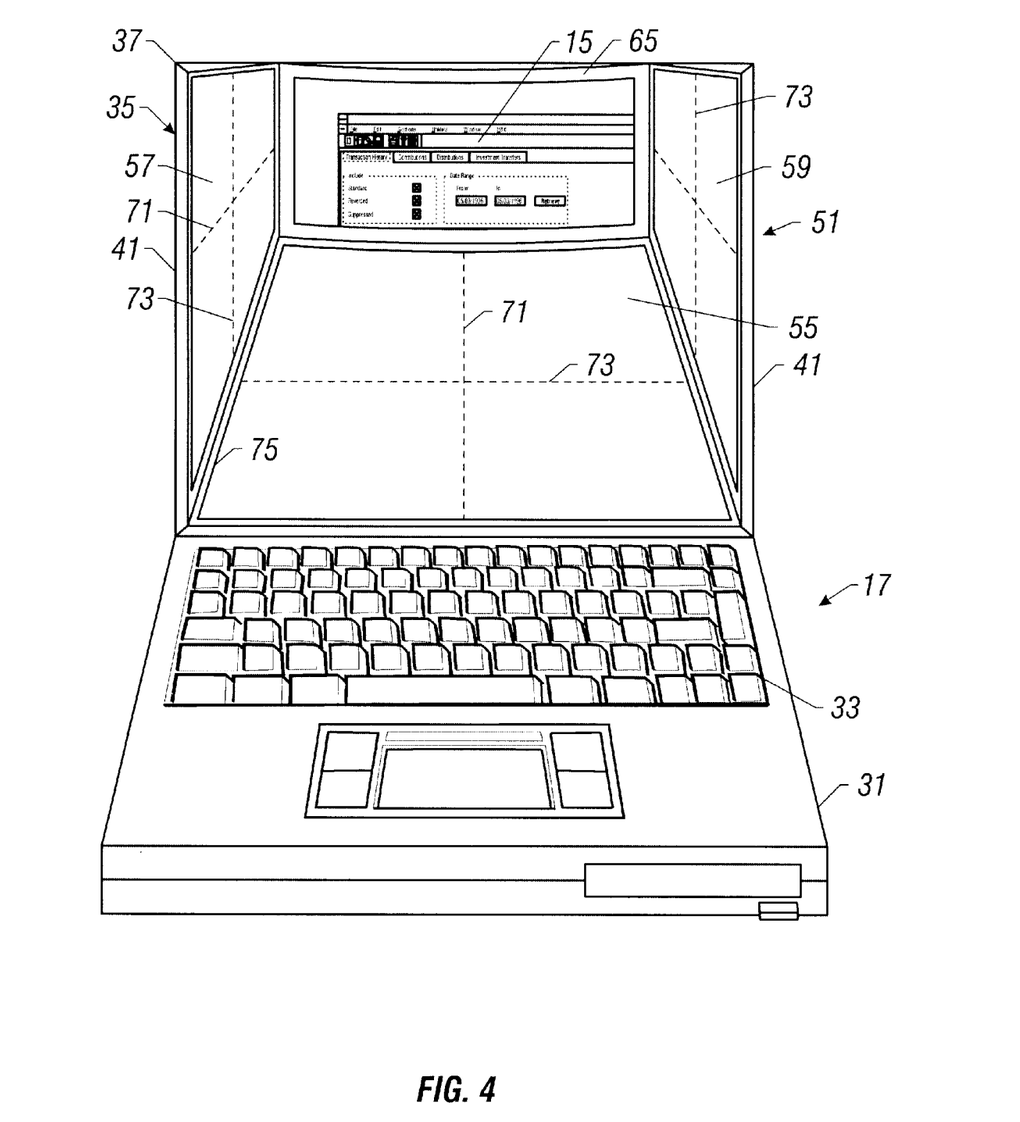
FIG. 4 is a front perspective view of the laptop computer and the light shield of FIG. 2.
Figure 5:
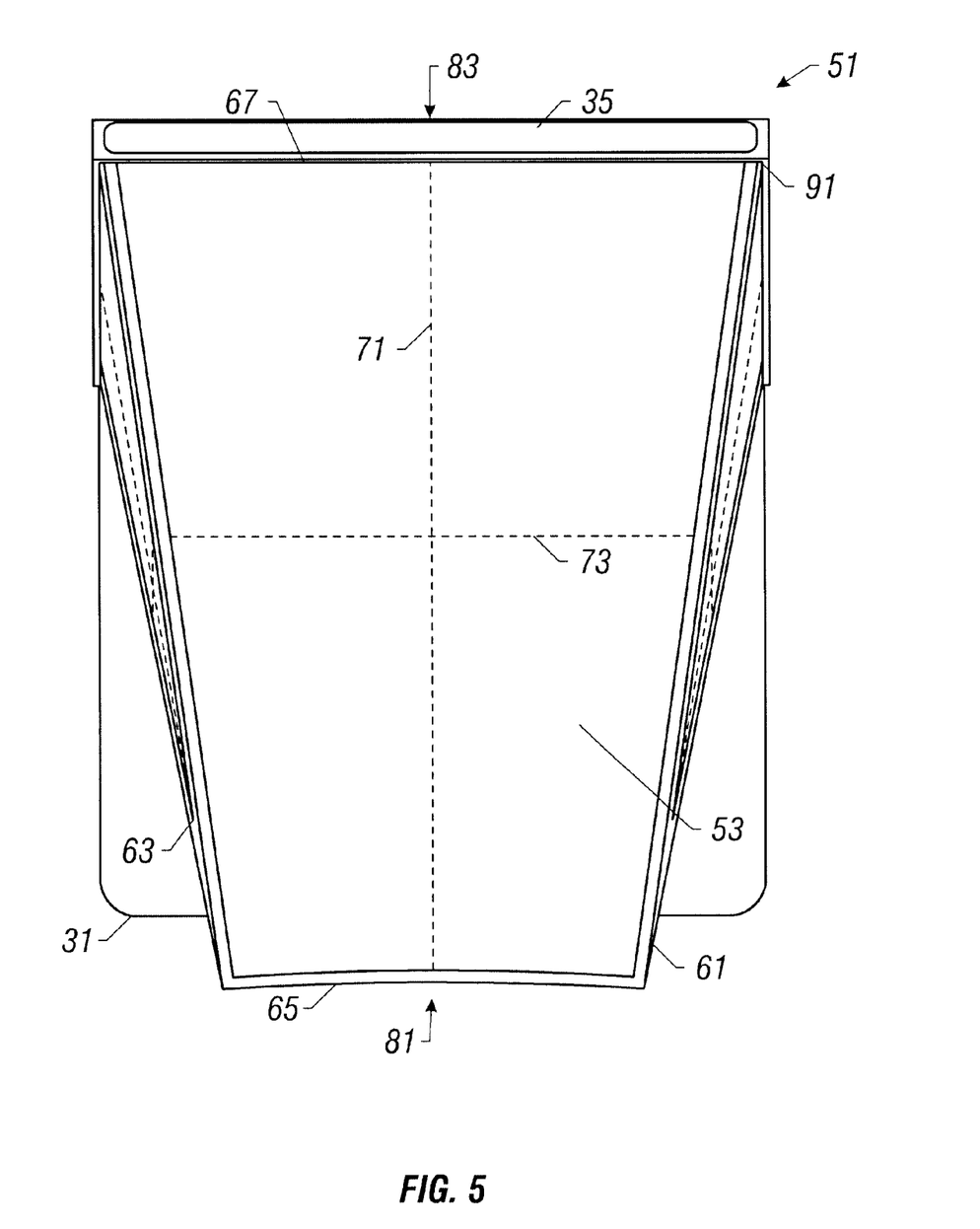
FIG. 5 is a top view of the laptop computer and light shield FIG. 2.

When portable laptop or notebook computers are used in outdoor or otherwise brightly lit environments, their display screens are often difficult to view. The display screens typically utilize a relatively low-powered liquid crystal display (LCD) to reduce power consumption and prolong battery life. Although LCD screens are more efficient, they also produce lower intensity images that are less visible than those of their desktop computer counterparts. Moreover, brightly lit environments make LCD screens appear dark for a variety of reasons. As shown in FIG. 1, direct sunlight 11 creates a direct glare or reflectance 13 on the glass of the LCD panel 15 of a portable computer 17. In addition, indirect sunlight 21 creates a diffuse glare 23 on the LCD glass 15. Finally, bright light conditions 25 cause the pupils of the user's eyes to constrict, thus allowing less of the illumination 29 from the computer's LCD screen to enter the user's eyes. These effects combine to make portable computers very difficult to operate in brightly lit conditions.

In the prior art, a number of methods and devices have been proposed to enhance the viewability of computer display images in brightly lit environments. Sunshades for electronic displays are commercially available and used primarily by professional photographers using digital cameras, and officials of sporting events that must view television monitors outdoors.

One example is described in U.S. Pat. No. 4,121,303. In that patent, a tubular, flexible hood 16 is provided for shielding external light from the eyes of the user and the video display screen 11 of a monitor 12. One end of the hood is attached to the monitor with an elastic band 19, and the other end of the hood is secured to the head of a user with an uncomfortable elastic band and hat 21. This design is ideally suited for use by operators of monitors who must maintain visual contact with the monitor at all times and those who need access to control knobs 15 on the monitor. The operator is unable to quickly or readily view anything but the monitor since the hood is literally wrapped around his or her head via the band and cap 21. Moreover, since the hood 16 is a flexible material, the user must use his or her neck to maintain enough tension in the hood to prevent it from sagging and blocking his or her view of the screen. Such a physical strain on the neck of the user will certainly cause muscle fatigue. In addition, some light is still permitted to enter the hood through openings 24 for the hands of the user. Although it is conceivable that this design could be adapted for use with a portable computer, it is a highly impractical solution as outdoor users of portable computers are typically not so transfixed with their display screens.

Other prior art solutions for enhancing the viewability of computer display screens may be generally characterized as two types of devices: those that dramatically alter the desired small, lightweight, and portable profile of laptop users, and those that are relatively consistent with such a profile. The first type of device typically employs a series of large, stiff, cumbersome panels that surround a monitor (and, often, the computer itself) to block only some of the direct and indirect sunlight when deployed. See, e.g., U.S. Pat. Nos. 5,095,385; 3,329,770; and 5,877,896. Although some of these types of devices may be folded to reduce their overall size when not in use, their folded configuration is larger than a folded laptop computer, thereby violating the small, lightweight, and portable profile laptop users seek. Furthermore, these solutions are designed to be spaced apart from the user by such a distance that a significant amount of direct and indirect sunlight is still permitted to reach the screen, and the constricting pupils of the eyes of the user.

The second type of device typically employs a series of small rigid panels that are attached to the monitor or cover of the laptop computer to block direct and indirect sunlight. See, e.g., U.S. Pat. Nos. 5,905,546; 5,218,474; and 5,069,529. Unfortunately, each of these devices only shield three sides of the display and are completely open on their lower ends (just above the keyboard of the laptop). This configuration permits a significant amount of direct and indirect sunlight to reach the screen and the eyes of the user, further dilating his or her eyes. Furthermore, other than U.S. Pat. No. 5,069,529 (which is designed for a desktop computer), these solutions are spaced apart from the user by such a distance that additional direct and indirect sunlight is still permitted to reach the screen and the eyes of the user.

Another problem with these devices is their lack of adaptability to different sized monitors. The rigid panels of these designs are pre-cut for specific laptop models and are limited to use therewith via fasteners that are also unable to compensate for variations in display dimensions. Moreover, the device of U.S. Pat. No. 5,069,529, requires is mating grooves 1d (FIG. 1) to be formed in the monitor itself, thereby; further restricting its use. U.S. Pat. No. 5,905,546, uses a separate rubber band 56 (FIG. 5) to attach the device to the laptop. The rubber band may. be easily broken or misplaced to render the device unusable. Although this latter device may be reconfigured for different sized displays, the multiple flaps utilized by the device must be refolded to do so. Furthermore, the fold-in flaps 71, 72, 73, 74 (FIG. 1) obscure the user's view of certain areas of the screen. When not in use, the devices of this second category may be folded to reduce their overall size. However, since the panels are rigid, the size of their folded configurations are limited to the size of their respective largest panels. Thus, an improved design for shielding direct and indirect light from the display of a laptop computer and the eyes of its user is needed.

SUMMARY OF THE INVENTION

A collapsible light shield for a portable computer shields direct and indirect light from the computer display and from the eyes of the user. The light shield has four flexible panels that form a generally tubular shape when in use. One end of the light shield has a contoured viewing port through which the user may view the screen. The other end of the light shield has a ring-like elastic fastener that detachably secures to three sides of the computer display. Each panel has two bisecting fold lines about which the tubular light shield may be collapsed into a substantially flat profile that is a small fraction of its original size.

Accordingly, it is an object of the present invention to improve the visibility of portable computer display screens.

It is an additional object of the present invention to provide an improved light shield for laptop computers.

Still another object of the present invention is to provide a device for enhancing the visibility of portable computer display screens by shielding direct and indirect light from the display screen and the eyes of the user.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Referring again to FIG. 1, the portable computer 17, such as a laptop or notebook computer, has a base 31 with a keyboard 33, and a cover 35 pivotally mounted to base 31 along a keyboard 33, and a cover 35 pivotally mounted to base 31 along its bottom edge 39. The display screen 15 is located in cover 35 which also has a top edge 37 and two side edges 41. Computer 17 has an open position (FIG. 1) wherein cover 35 is rotated upright for viewing display 15, and a stowable closed position (FIG. 9) wherein cover 35 is pivoted flush against base 31 when computer 17 is not in use.

Referring now to FIGS. 2–5, a sunshade or ambient light shield 51 is shown mounted to computer 17 for shielding direct and indirect light from display 15, and from the eyes of the user. In these views, light shield 51 is shown expanded in its deployed configuration, which is generally tubular in shape. The body of light shield 51 is formed by four opaque, dark-colored panels 53, 55, 57, 59 representing the top, bottom, left, and right sides, respectively, of light shield 51.In the embodiment shown, top and bottom panels 53, 55 are identical, and left and right panels 57, 59 are identical. Each panel 53, 55, 57, 59 is formed from a flexible, resilient material that is suitable for such applications.

Each panel 53, 55, 57, 59 has two longitudinal edges 61, 63, a first end 65, a second end 67, a bisecting longitudinal fold line 71 extending between the first and second ends 65, 67, and a bisecting transverse fold line 73 extending between the longitudinal edges 61, 63. Each of the longitudinal edges 61, 63 of each of the panels 53, 55, 57, 59 is hingably joined to one of the longitudinal edges 61, 63 of an adjacent one of the panels 53, 55, 57, 59. For example, edge 61 of top panel 53 is joined to edge 63 of right panel 59, and edge 63 of top panel 53 is joined to edge 61 of left panel 57. In the version illustrated, the panels 53, 55, 57, 59 are permanently joined along their longitudinal edges 61, 63 by reinforcement ribs such as strips of adhesive tape 75.

Light shield 51 has a viewing port 81 with a rectangular viewing area defined by the first ends 65 of panels 53, 55, 57, 59. When the light shield 51 is in the deployed configuration of FIGS. 2–5, the viewing-port 81 (i.e., the first ends 65) is contoured to conform to a face of a user to shield direct and indirect light from the eyes of the user. Light shield 51 also has an attachment end 83 with a rectangular attachment area defined by the second ends 67 of panels 53, 55, 57, 59. Note that the attachment area defined by attachment end 83 is significantly larger in surface area than the viewing area defined by viewing port 81, such that light shield 51 tapers or narrows from attachment end 83 to viewing port 81 along all four sides.

The final component of light shield 51 is an elastic fastener 91 that is mounted to and circumscribes the attachment end 83. Elastic fastener 91 preferably comprises an elasticized band located with a "sock" of flexible fabric. The fabric of elastic fastener 91 is permanently bonded to attachment end 83. As illustrated in FIGS. 2–5, elastic fastener 91 flexibly secures the light shield 51 to the top edge 37 and two side edges 41 of the cover 35 of the portable computer 17 to shield direct and indirect light from the display screen 15. The elasticity and flexibility of fastener 91 is also capable of accommodating computers covers with 13 to 15 inch monitors without modification.

Figure 6:
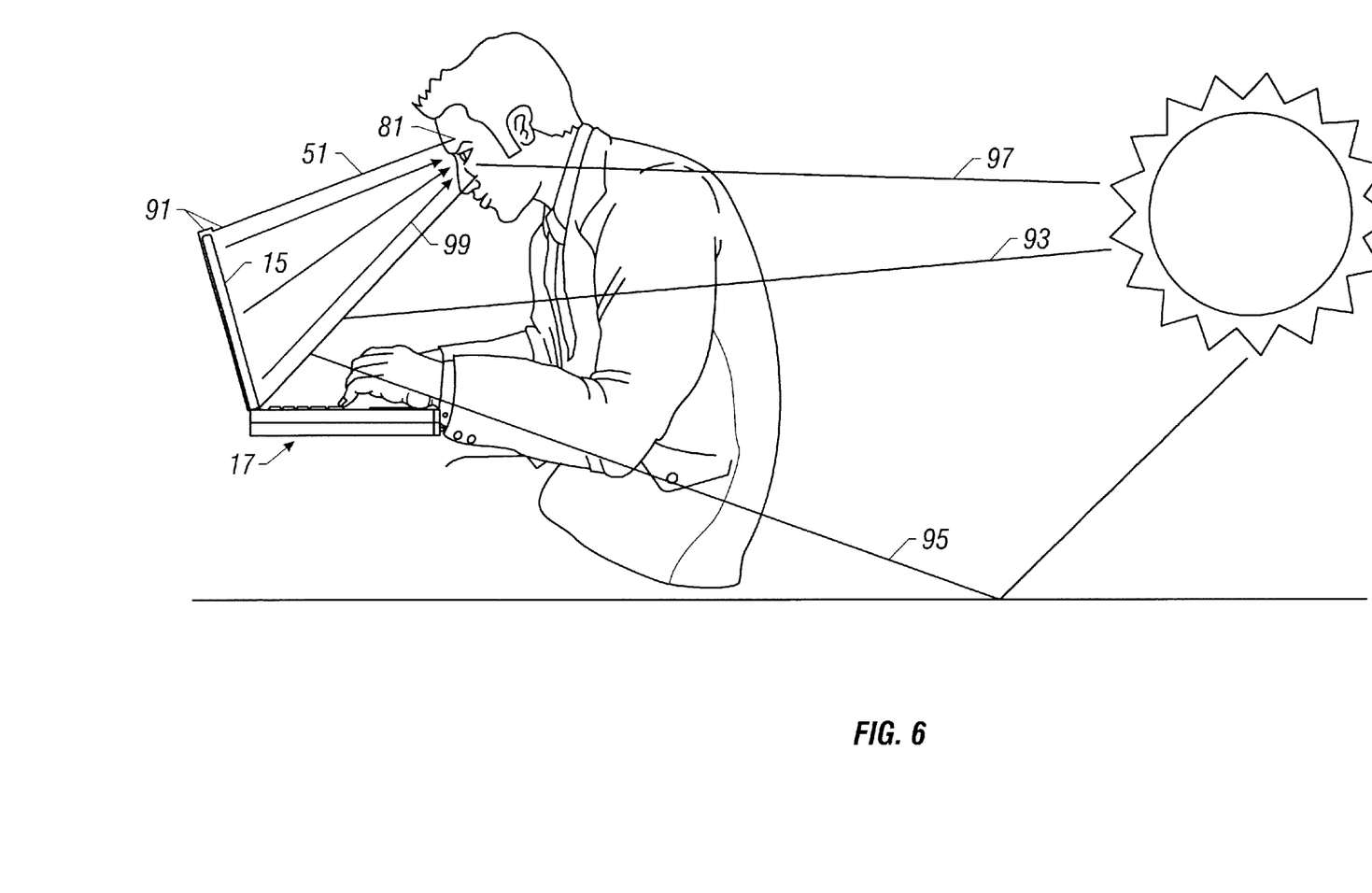
FIG. 6 is a schematic diagram of the laptop computer and light shield of FIG. 2 during use in a brightly lit environment.

In operation, light shield 51 is removably mounted to computer 17 as described above. Elastic fastener 91 is secured around the top edge 37 and side edges 41 of cover 35. Even though the lower edge portion of fastener 91 is unsecured (FIG. 4), the elastic band within the sock draws the lower edge portion taut as shown such that fastener 91 does not interfere with operation of keyboard 33. During use (FIG. 6), both direct light 93 and indirect light 95 are prevented from reaching display 15. In addition, the contoured viewing port 81 prevents bright ambient light 97 from dilating the eyes of the user, thereby allowing more of the light 99 from display 15 to be viewed by the user.

Figure 7:
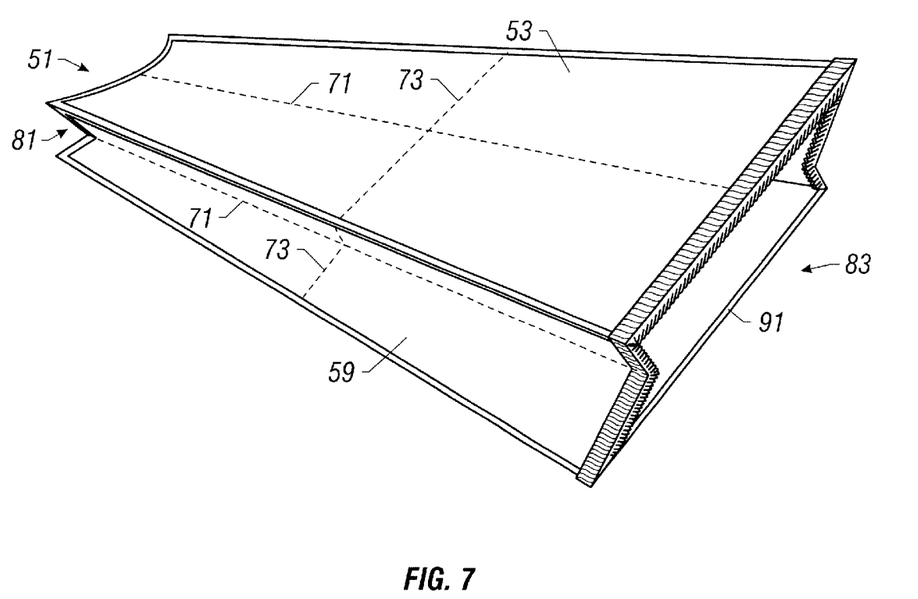
FIG. 7 is an isometric view of the light shield of FIG. 2 at an initial folded stage.
Figure 8:
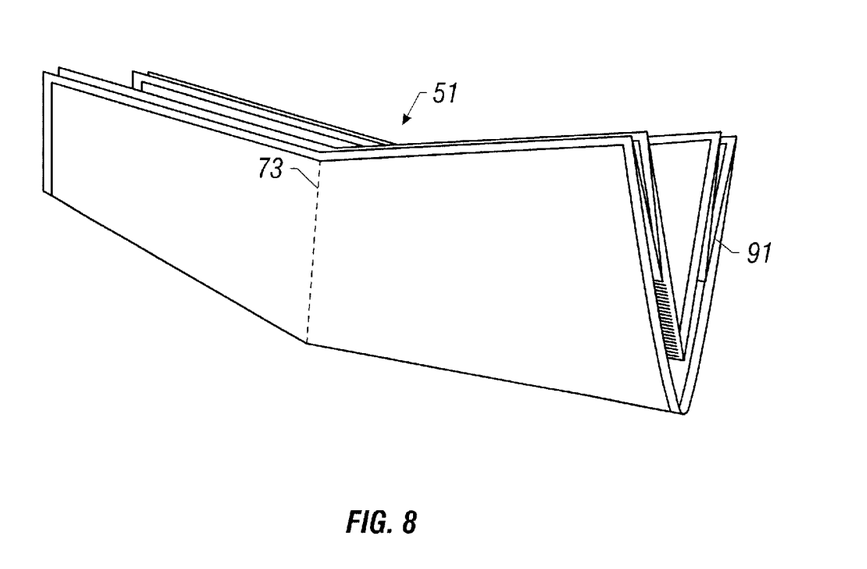
FIG. 8 is an isometric view of the light shield of FIG. 2 at an intermediate folded stage.
Figure 9:
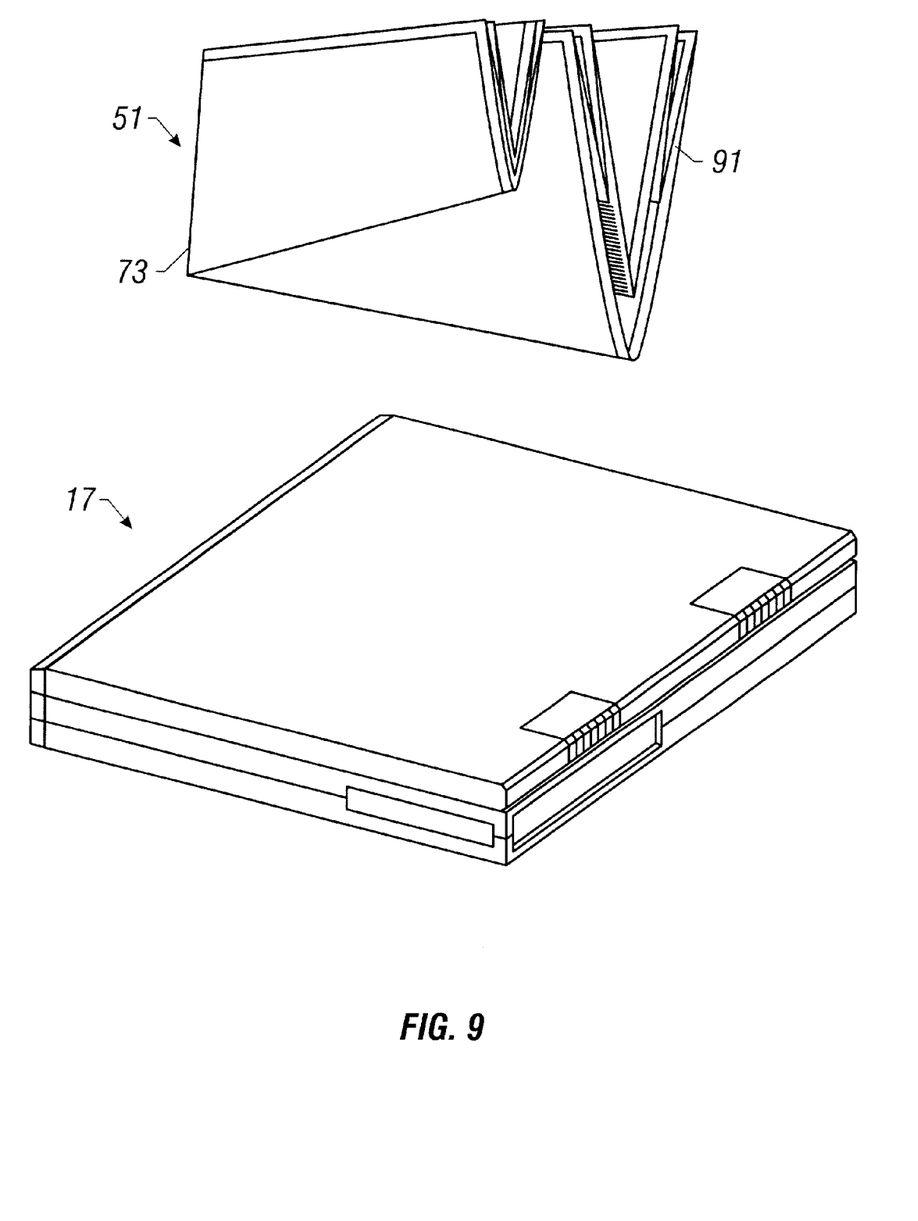
FIG. 9 is an isometric view of the light shield of FIG. 2 completely folded.

Referring now to FIGS. 7–9, light shield 51 also has a collapsed configuration when it is not in use for easy portability and compact stowage. After light shield 51 is removed from computer 17, left and right side panels 57, 59 are folded along their longitudinal fold lines 71 inward (FIG. 7) into the interior of light shield 51. With light shield 51 in this generally flat profile, top and bottom panels 53, 55 are folded over along their longitudinal fold lines 71 (FIG. 8) to reduce light shield 51 to half the size of the previous step. Finally, the twice-folded light shield 51 is folded a third time about the remaining transverse fold line 73 (FIG. 9) to approximately a fourth of the size of the initial fold size.

The invention has several advantages. The trapezoidal shape of the present design creates a tapered viewing chamber that is optimized for the individual viewer or user of the computer screen. Prior art designs for cameras and television monitors have square panels without a tapered chamber. The tapered chamber allows for more light blockage while maintaining full view of the computer screen up to about four inches away from the viewing end of the sunshade device. The ergonomically correct curvature of the viewing end fits the user's face to further reduce sunlight exposure to the screen and user's eyes. Prior art designs have viewing ends with straight edges and do not conform to the user's face. The curved viewing end is superior at blocking light to reduce glare and allowing for maximum pupil dilation of the user's eyes.

The flexible "sock" method of attaching the sunshade device to the laptop cover is easy to use and accommodates various sizes of covers. The prior art designs for cameras and television monitors require semi-permanent adhesive attachments or hook-and-loop fastener strips, such as VELCRO®, to be applied to the device in order to attach the sunshade. The sock makes the sunshade easier to attach and detach, and requires no modification to the device such as applying adhesive or fasteners. The method of collapsing and folding the sunshade allows it to be easily stored in the user's laptop carrying case with minimal additional storage volume required. Prior art designs are not easily dismantled or stored for transport by the user. This significant reduction in storage size and portability feature matches the user's portable transport scenario for the notebook computer.

While the invention has been shown or described in only some of its forms, it should be apparent to those skilled in the art that it is not so limited, but is susceptible to various changes without departing from the scope of the invention.

What is claimed is:

1. A light shield for a portable computer having a base, a cover pivotally mounted to the base, and a display screen located in the cover, wherein the cover has a top edge, a bottom edge, and two side edges, the light shield comprising:
    a plurality of opaque panels pivotally joined to each other and having a deployed configuration wherein the panels expand into a generally tubular shape, and a collapsed configuration wherein the panels fold into a generally flat profile;
    a viewing port on one end of the panels in the deployed configuration, wherein the viewing port shields direct and indirect light from a user's eyes;
    an attachment end opposite the viewing port;
    fastening means mounted on the attachment end for securing the light shield to the top edge and the two side edges of the cover of the portable computer to shield direct and indirect light from the display screen; and wherein
    each of the panels has a bisecting longitudinal fold line extending between the viewing port and attachment end, and a bisecting transverse fold line perpendicular to the longitudinal fold line.

2. A light shield for a portable computer having a base, a cover pivotally mounted to the base, and a display screen located in the cover, wherein the cover has a top edge, a bottom edge, and two side edges, the light shield comprising:
    a plurality of opaque panels pivotally joined to each other and having a longitudinal fold line, a transverse fold line perpendicular to the longitudinal fold line, a deployed configuration wherein the panels expand into a generally tubular shape, and a collapsed configuration wherein the panels fold into a generally flat profile;
    a viewing port having a viewing area on one end of the panels in the deployed configuration, wherein the viewing port shields direct and indirect light from a user's eyes;
    an attachment end opposite the viewing port and having an attachment area that is greater than the viewing area.; and
    an elastic fastener mounted to the attachment end and, when in the deployed configuration, adapted to secure the light shield to the top edge and the two side edges of the cover of the portable computer to shield direct and indirect light from the display screen.

3. The light shield of claim 2 wherein the panels are formed from a flexible, resilient material.

4. The light shield of claim 2 wherein each of the panels has two longitudinal edges that are pivotally joined to other ones of the longitudinal edges of other ones of the panels.

5. The light shield of claim 2 wherein the viewing port is contoured to conform to a face of the user.

6. The light shield of claim 2 wherein the elastic fastener circumscribes the attachment end.

7. A light shield for a portable computer having a base, a cover pivotally mounted to the base, and a display screen located in the cover, wherein the cover has a top edge, a bottom edge, and two side edges, the light shield comprising:
    four opaque panels formed from a flexible, resilient material, each having two longitudinal edges, a first end, a second end, a bisecting longitudinal fold line extending between the first and second ends, and a bisecting transverse fold line extending between the longitudinal edges, wherein each of the longitudinal edges of each of the panels is pivotally joined to one of the longitudinal edges of another one of the panels; wherein
    the light shield has a deployed configuration wherein the panels expand into a generally tubular shape, and a collapsed configuration wherein the panels fold into a generally flat profile along the longitudinal and transverse fold lines; the light shield further comprising:
    a viewing port having a viewing area defined by the first ends of the panels, wherein when the light shield is in the deployed configuration, the viewing port is contoured to conform to a face of a user to shield direct and indirect light from the eyes of the user;
    an attachment end having an attachment area defined by the second ends, wherein the attachment area that is greater than the viewing area; and
    an elastic fastener mounted to and circumscribing the attachment end, the elastic fastener being adapted to secure the light shield to the top edge and the two side edges of the cover of the portable computer to shield direct and indirect light from the display screen.

8. The light shield of claim 7 wherein the longitudinal edges of the panels are pivotally joined together by strips of flexible tape.

* * * * *